United States Patent
Yamazaki et al.

(10) Patent No.: US 9,635,707 B2
(45) Date of Patent: Apr. 25, 2017

(54) RADIO COMMUNICATION SYSTEM, RADIO BASE STATION, AND BASE STATION PARAMETER-ADJUSTMENT METHOD

(75) Inventors: Chiharu Yamazaki, Tokyo (JP); Kazutaka Nakamura, Yokohama (JP); Taku Nakayama, Yamato (JP); Shingo Joko, Kawasaki (JP); Yoshimasa Kusano, Yokohama (JP)

(73) Assignee: KYOCERA Corporation, Kyoto (JP)

(*) Notice: Subject to any disclaimer, the term of this patent is extended or adjusted under 35 U.S.C. 154(b) by 710 days.

(21) Appl. No.: 13/700,111

(22) PCT Filed: May 27, 2011

(86) PCT No.: PCT/JP2011/062279
§ 371 (c)(1),
(2), (4) Date: Nov. 26, 2012

(87) PCT Pub. No.: WO2011/149084
PCT Pub. Date: Dec. 1, 2011

(65) Prior Publication Data
US 2013/0115989 A1    May 9, 2013

(30) Foreign Application Priority Data
May 27, 2010   (JP) .................................. 2010-122144

(51) Int. Cl.
H04B 7/00   (2006.01)
H04W 88/00   (2009.01)
(Continued)

(52) U.S. Cl.
CPC ........... *H04W 88/00* (2013.01); *H04W 16/08* (2013.01); *H04W 36/22* (2013.01);
(Continued)

(58) Field of Classification Search
CPC . H04W 16/08; H04W 36/22; H04W 72/0426; H04W 72/0486; H04W 88/00;
(Continued)

(56) References Cited

U.S. PATENT DOCUMENTS

| 2010/0124933 | A1* | 5/2010 | Chowdhury ........ H04L 12/5695 455/453 |
| 2010/0214943 | A1* | 8/2010 | Immendorf et al. .......... 370/252 |
| 2011/0171952 | A1* | 7/2011 | Niu ............................. 455/422.1 |

FOREIGN PATENT DOCUMENTS

| JP | 2007-180753 A | 7/2007 |
| JP | 2009-512361 A | 3/2009 |

OTHER PUBLICATIONS

3GPP, 3rd Generation Partnership Project; Technical Specification Group Radio Access Network; Evolved Universal Terrestrial Radio Access Network (E-UTRAN); Self-configuring and self-optimizing network (SON) use cases and solutions (Release 9), 3GPP TR 36.902 v9.1.0 (Mar. 2010), Mar. 2010, entire text, all drawings.
(Continued)

Primary Examiner — Xin Jia
(74) Attorney, Agent, or Firm — Studebaker & Brackett PC

(57) ABSTRACT

A radio base station (eNB1) receives load information indicating the load level of different radio base station (eNB2) and adjusts a base station parameter, which is used for defining coverage, in accordance with a result of comparison between the load level of the radio base station (eNB1) and that of the different radio base station (eNB2). The radio base station (eNB1) corrects at least one of the load level of the radio base station (eNB1) and that of the different radio base station (eNB2), which are compared with each other, in accordance with a number of radio terminals connected to the radio base station (eNB1).

6 Claims, 6 Drawing Sheets

(51) Int. Cl.
*H04W 16/08* (2009.01)
*H04W 36/22* (2009.01)
*H04W 72/04* (2009.01)
*H04W 92/20* (2009.01)

(52) U.S. Cl.
CPC .... *H04W 72/0426* (2013.01); *H04W 72/0486* (2013.01); *H04W 92/20* (2013.01)

(58) Field of Classification Search
CPC ............ H04W 92/20; H04W 28/0284; H04W 28/0289; H04W 28/08
USPC ................................................. 455/453, 507
See application file for complete search history.

(56) References Cited

OTHER PUBLICATIONS

International Search Report for PCT/JP2011/062279, mailed Jul. 26, 2011.

3GPP, 3rd Generation Partnership Project; Technical Specification Group Radio Access Network; Evolved Universal Terrestrial Radio Access Network (E-UTRAN); Self-configuring and self-optimizing network use cases and solutions (Release 9), 3GPP TR 36.902 v9.0.0 (Sep. 2009), Sep. 2009, entire text, all drawings.

An Office Action; "Notice of Reason for Rejection," issued by the Japanese Patent Office on Feb. 25, 2014, which corresponds to Japanese Patent Application No. 2010-122144 and is related to U.S. Appl. No. 13/700,111; with English language statement of relevance.

* cited by examiner

RADIO COMMUNICATION SYSTEM, RADIO BASE STATION, AND BASE STATION PARAMETER-ADJUSTMENT METHOD

TECHNICAL FIELD

The present invention relates to a radio communication system, a radio base station, and a base station parameter-adjustment method to which a SON technique is applied.

BACKGROUND ART

In LTE (Long Term Evolution) standardized in 3GPP (3rd Generation Partnership Project) which is a standardization organization for radio communication systems, there are applied SON (Self Organizing Network) techniques in which a radio base station autonomously adjusts its parameters (referred to below as base station parameters) without human intervention (see Non-Patent Document 1, for example).

As one of the SON techniques, there is proposed a method by which base station parameters (such as handover parameters) defining coverage are adjusted according to load information exchanged between radio base stations in order to balance loads between the radio base stations. Such an optimization technique is referred to as MLB (Mobility Load Balancing). Note that coverage means a logical or physical communication area of a radio base station.

Specifically, in an LTE system, the following four classes of load information are defined. (a) Usage of PRBs (Physical Resource Blocks) being units for time-frequency resource allocation, (b) load of backhaul between a radio base station and a core network, (c) hardware load of a radio base station, and (d) capacity class being an index of relative communication capacity of a radio base station, and a ratio of available communication capacity to the communication capacity.

PRIOR ART DOCUMENT

Non-Patent Document

Non-Patent Document 1: 3GPP TR36. 902 "SON use cases and solutions"

SUMMARY OF THE INVENTION

From the viewpoint of ensuring fairness among radio terminals, it is preferable that the amounts of radio resources allocated to the radio terminals be made even. For this reason, it is also desirable that the same number of radio terminals be connected to each of the radio base stations.

However, in aforementioned MLB, even when few radio terminals exclusively use radio resources of a single radio base station, the load of the radio base station is regarded as high, and base station parameters are adjusted to reduce coverage of this radio base station. In this case, fewer radio terminals are caused to exclusively use the radio resources of this radio base station, leading to a problem of increased unfairness among radio terminals.

Accordingly, the present invention has an objective to provide a radio communication system, a radio base station, and a base station parameter-adjustment method capable of balancing loads between radio base stations while reducing unfairness among radio terminals.

In order to solve the problem described above, the present invention has features below.

First of all, a feature of a radio communication system according to the present invention is summarized as follows. A radio communication system (radio communication system 1) comprises: a first radio base station (radio base station eNB2) configured to transmit load information indicating a load level of the first radio base station; a second radio base station (radio base station eNB1) configured to receive the load information, and adjust a base station parameter defining coverage according to a result of comparison between a load level of the second radio base station and the load level of the first radio base station indicated by the received load information; and a controller (controller 120, controller 220) configured to perform control to correct at least one of the load level of the first radio base station and the load level of the second radio base station which are targets of the comparison, depending on the number of radio terminals connected to at least one of the first radio base station and the second radio base station.

Another feature of the radio communication system (radio communication system 1) according to the present invention is summarized as follows. In the radiocommunication system (radio communication system 1) according to the aforementioned feature, the controller is provided with at least one of the first radio base station and the second radio base station.

A feature of a radio base station according to the present invention is summarized as follows. A radio base station (radio base station eNB1) comprises: a receiver (network communication unit 140) configured to receive load information indicating a load level of a different radio base station (radio base station eNB2); and a controller (controller 120) configured to perform control to adjust a base station parameter defining coverage, according to a result of comparison between a load level of the radio base station and the load level of the different radio base station indicated by the load information. The controller corrects at least one of the load level of the different radio base station and the load level of the radio base station which are targets of the comparison, depending on the number of radio terminals connected to the radio base station.

Another feature of the radio base station (radio base station eNB1) according to the present invention is summarized as follows. In the radio base station (radio base station eNB1) according to the aforementioned feature, the smaller the number of radio terminals connected to the radio base station, the lower the controller corrects the load level of the radio base station as compared to the load level of the different radio base station.

Another feature of the radio base station (radio base station eNB1) according to the present invention is summarized as follows. In the radio base station (radio base station eNB1) according to the aforementioned feature, the larger the number of radio terminals connected to the radio base station, the higher the controller corrects the load level of the radio base station as compared to the load level of the different radio base station.

Another feature of the radio base station according to the present invention is summarized as follows. In the radio base station according to the aforementioned feature, when the corrected load level of the radio base station is lower than the load level of the different radio base station, the controller adjusts the base station parameter to expand coverage of the radio base station.

Another feature of the radio base station (radio base station eNB1) according to the present invention is summarized as follows. In the radio base station (radio base station eNB1) according to the aforementioned feature, when the corrected load level of the radio base station is higher than the load level of the different radio base station, the controller adjusts the base station parameter to reduce coverage of the radio base station.

A feature of a radio base station according to the present invention is summarized as follows. A radio base station (radio base station eNB2) used in a radio communication system (radio communication system 1) capable of autonomously adjusting a base station parameter defining coverage on the basis of load information exchanged between radio base stations, comprises: a transmitter (network communication unit 240) configured to transmit load information indicating a load level of the radio base station; and a controller (controller 220) configured to perform control to adjust the load level indicated by the load information, depending on the number of radio terminals connected to the radio base station.

Another feature of the radio base station (radio base station eNB2) according to the present invention is summarized as follows. In the radio base station (radio base station eNB2) according to the aforementioned feature, the smaller the number of radio terminals connected to the radio base station, the lower the controller corrects the load level indicated by the load information.

Another feature of the radio base station (radio base station eNB2) according to the present invention is summarized as follows. In the radio base station (radio base station eNB2) according to the aforementioned feature, the larger the number of radio terminals connected to the radio base station, the higher the controller corrects the load level indicated by the load information.

A feature of abase station parameter-adjustment method according to the present invention is summarized as follows. A base station parameter-adjustment method comprises the steps of: transmitting load information indicating a load level of a first radio base station from the first radio base station; receiving the load information by a second radio base station; and adjusting a base station parameter defining coverage by the second radio base station, according to a result of comparison between a load level of the second radio base station and the load level of the first radio base station indicated by the load information received in the receiving step. At least one of the load level of the first radio base station and the load level of the second radio base station which are targets of the comparison is corrected, depending on the number of radio terminals connected to at least one of the first radio base station and the second radio base station.

DESCRIPTION OF THE EMBODIMENTS

A description is given of first to third and other embodiments of the present invention, with reference to the drawings. In the following description of the drawings in the embodiments, same or similar reference signs denote same or similar portions.

(1) First Embodiment

In the first embodiment, (1.1) configuration of radio communication system, (1.2) configuration of radio base station, (1.3) operation of radio communication system, and (1.4) effects and advantages are described in this order.

(1.1) Configuration of Radio Communication System

Figure 1:
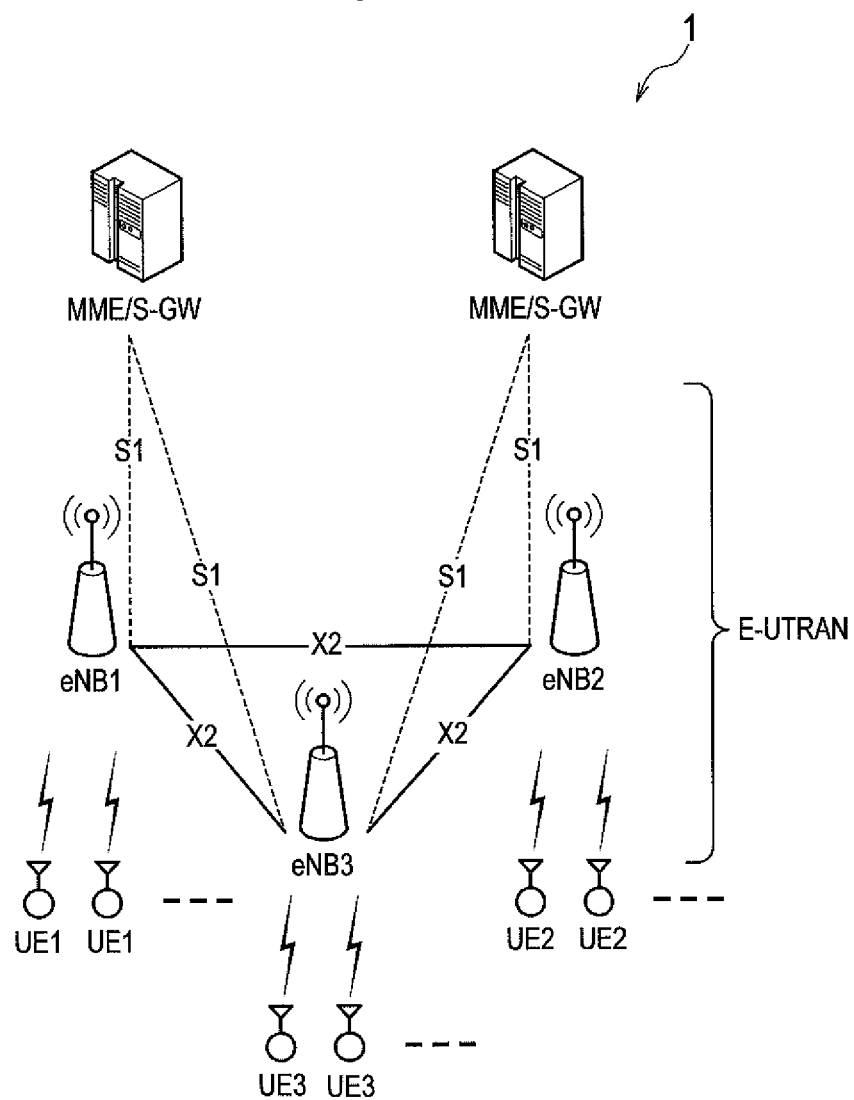
FIG. 1 is a view showing a configuration of a radio communication system of first to third embodiments of the present invention.

FIG. 1 is a view showing a configuration of a radio communication system 1 of the first embodiment. The radio communication system 1 is configured according to LTE standards.

As shown in FIG. 1, multiple radio base stations eNB (radio base stations eNB1 to eNB3) form an E-UTRAN (Evolved-UMTS Terrestrial Radio Access Network). Each of the multiple radio base stations eNB forms a cell which is a communication area for providing a service to radio terminals UE.

Adjacent radio base stations eNB can communicate via an X2 interface being a logical communication path providing inter-base station communication. Each of the multiple radio base stations eNB can communicate with an EPC (Evolved Packet Core), namely, an MME (Mobility Management Entity)/S-GW (Serving Gateway) via an S1 interface. A radio terminal UE is a radio communication device held by a user, and is also referred to as user equipment. Multiple radio terminals UE1 connect to the radio base station eNB1 in a cell formed by the radio base station eNB1. Multiple radio terminals UE2 connect to the radio base station eNB2 in a cell formed by the radio base station eNB2. Multiple radio terminals UE3 connect to the radio base station eNB3 in a cell formed by the radio base station eNB3.

The radio terminal UE is configured to measure quality of a radio signal (i.e., radio quality) received from the radio base station eNB, and send a report on the result of measurement of radio quality (measurement report) to the connecting radio base station eNB. Here, radio quality refers to a reference signal received power (RSRP), for example. A measurement report may be sent from the radio terminal UE to the radio base station eNB by using an event set by the radio base station eNB as a trigger, or may be periodically sent from the radio terminal UE to the radio base station eNB.

The radio base station eNB to which the radio terminal UE connects performs handover control in which a connection destination of the radio terminal UE is switched according to a measurement report received from the radio terminal UE. In a case where the radio terminal UE receives reference signals from multiple radio base stations eNB, the measurement report may include multiple RSRPs of the multiple radio base stations. The radio base station eNB to which the radio terminal UE connects performs control according to the measurement report, so that the radio terminal UE may connect to a radio base station eNB having the highest RSRP among the multiple radio base stations eNB, for example.

The radio communication system 1 supports aforementioned MLB. In the first embodiment, each of the radio base stations eNB adjusts a handover parameter as a base station parameter defining coverage, according to load information exchanged between the radio base stations eNB. For example, when a load of the radio base station eNB1 is higher than a load of the radio base station eNB2 (or eNB3), the radio base stations eNB adjust the handover parameters so that coverage of the radio base station eNB1 can be reduced and coverage of the radio base station eNB2 (or eNB3) can be expanded.

In the first embodiment, this handover parameter is an offset value for correcting the RSRP measured by the radio terminal UE. For example, assume a case where the radio terminal UE1 can receive radio signals from both of the radio base station eNB1 and the radio base station eNB2. Here, before comparing an RSRP (referred to below as RSRP1) of the radio base station eNB1 and an RSRP (referred to below as RSRP2) of the radio base station eNB2, an offset value for correcting RSRP1 to a higher value is added to RSRP1. This makes it more likely for the offset RSRP1 to exceed the RSRP2. Accordingly, the radio base station eNB1 is preferentially selected as the connection destination (handover destination), and thus coverage of the radio base station eNB1 is expanded. Note that in order to avoid unnecessary handovers, one offset value is set for each pair of radio base stations eNB, and the value is shared between the paired radio base stations eNB.

Hereinbelow, a description is given mainly of a case where handover parameters are adjusted between the radio base station eNB1 and the radio base station eNB2.

(1.2) Configuration of Radio Base Station eNB1

Figure 2:
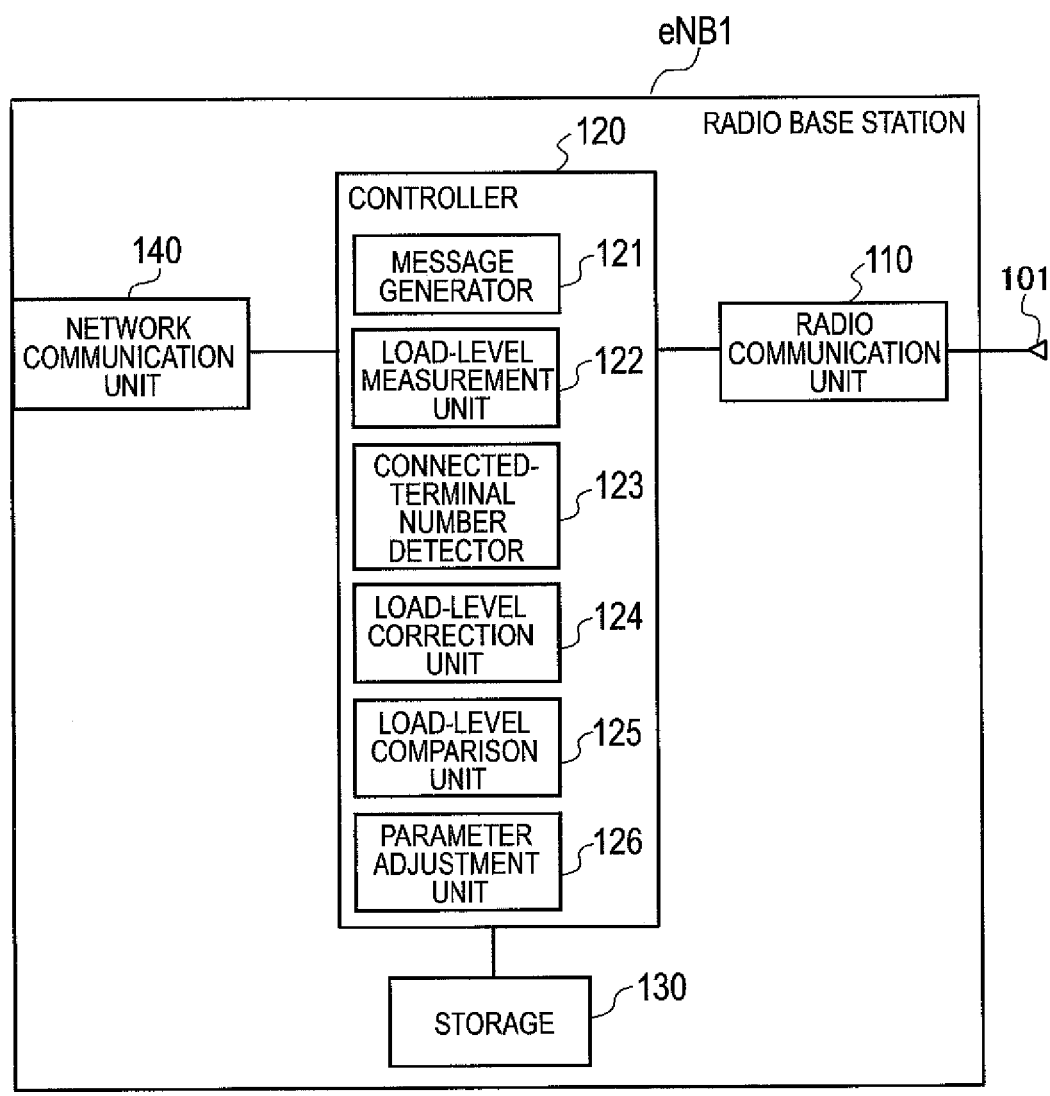
FIG. 2 is a block diagram showing a configuration of a radio base station of the first embodiment of the present invention.

Next, a description is given of a configuration of the radio base station eNB1 of the first embodiment. FIG. 2 is a block diagram showing a configuration of the radio base station eNB1 of the first embodiment.

As shown in FIG. 2, the radio base station eNB1 includes an antenna unit 101, a radio communication unit 110, a controller 120, a storage 130, and a network communication unit 140.

The antenna unit 101 is used to send and receive radio signals. The radio communication unit 110 is formed of a radio frequency (RF) circuit, a baseband (BB) circuit and the like, for example, and is configured to exchange radio signals with the radio terminal UE1 via the antenna unit 101. In addition, the radio communication unit 110 is configured to modulate and encode transmission signals, as well as to demodulate and decode reception signals.

The controller 120 is formed of a CPU, for example, and is configured to control various functions of the radio base station eNB1. The storage 130 is formed of a memory, for example, and is configured to store therein various information used for control and the like of the radio base station eNB1. The network communication unit 140 is configured to perform inter-base station communication using the X2 interface, and communication using the S1 interface.

The controller 120 includes a message generator 121, a load-level measurement unit 122, a connected-terminal number detector 123, a load-level correction unit 124, a load-level comparison unit 125, and a parameter adjustment unit 126.

The message generator 121 is configured to generate a Resource Status Request message for requesting transmission of load information, and a Mobility Change Request message for requesting a change in a handover parameter. The Resource Status Request message and the Mobility Change Request message are sent by the network communication unit 140 to the radio base station eNB2 adjacent to the radio base station eNB1.

A Resource Status Request message includes Report Characteristics which is information indicating a class of load information whose transmission is requested, and information indicating a transmission cycle of load information. Here, classes of load information include the following (a) to (d). (a) Usage of PRBs(Physical Resource Blocks) being units for time-frequency resource allocation, (b) load of backhaul between a radio base station and a core network, (c) hardware load of a radio base station, and (d) capacity class being an index of relative communication capacity of a radio base station, and a ratio of available communication capacity to the communication capacity.

Upon receipt of a Resource Status Request message, the radio base station eNB2 sends a Resource Status Response message being a positive response, or a Resource Status Failure message being a negative response, as will be described below. In a case of accepting the Resource Status Request message, the radio base station eNB2 sends Resource Status Update messages including load information in the transmission cycle included in the Resource Status Request message. At this time, the radio base station eNB2 sends load information of a class indicated by Report Characteristics included in the Resource Status Request message. The network communication unit 140 is configured to periodically receive Resource Status Response messages from the radio base station eNB2.

The load-level measurement unit 122 is configured to measure its own load level (i.e., load level of the radio base station eNB1). The load-level measurement unit 122 may be configured to measure the load level only of the class selected in the aforementioned Report Characteristics.

The connected-terminal number detector 123 is configured to detect the number of radio terminals UE1 connected to the radio base station eNB1. For example, the connected-terminal number detector 123 can detect the number of radio terminals UE1 connected to the radio base station eNB1 by referring to information from a scheduler (not shown) included in the radio base station eNB1. The scheduler is configured to allocate and release radio resources (PRBs) to and from the radio terminals UE1.

The load-level correction unit 124 is configured to correct a load level of the radio base station eNB2 indicated by load information received by the network communication unit 140, and/or its own load level (i.e., load level of the radio base station eNB1) measured by the load-level measurement unit 122, depending on the number of radio terminals UE1 detected by the connected-terminal number detector 123.

Specifically, the smaller the number of radio terminals UE1 connected to the radio base station eNB1, the lower the load-level correction unit 124 corrects its load level. Alternatively, the smaller the number of radio terminals UE1 connected to the radio base station eNB1, the higher the load-level correction unit 124 corrects the load level of the radio base station eNB2.

In addition, the larger the number of radio terminals UE1 connected to the radio base station eNB1, the higher the load-level correction unit 124 corrects its load level. Alternatively, the larger the number of radio terminals UE1 connected to the radio base station eNB1, the higher the load-level correction unit 124 corrects the load level of the radio base station eNB2.

Hereinbelow, a description is given of a case where the load-level correction unit 124 corrects its own load level measured by the load-level measurement unit 122.

For example, a correction value for each of segments of number of connected terminals is previously stored in the storage 130. The load-level correction unit 124 reads a correction value corresponding to the number of radio terminals UE1 detected by the connected-terminal number detector 123 from the storage 130, and makes a correction by adding the read correction value to its own load level measured by the load-level measurement unit 122. The same correction method can be applied to a case of correcting the load level of the radio base station eNB2.

Alternatively, a correction-value calculation formula to which the number of terminals can be assigned is stored in the storage 130. The load-level correction unit 124 makes a correction by assigning the number of radio terminals UE1 detected by the connected-terminal number detector 123 to the correction-value calculation formula, and adding the correction value calculated from the correction-value calculation formula to its own load level measured by the load-level measurement unit 122. The same correction method can be applied to a case of correcting the load level of the radio base station eNB2.

The load-level comparison unit 125 is configured to compare its own load level corrected by the load-level correction unit 124, and the load level of the radio base station eNB2. The own load level measured by the load-level measurement unit 122 is corrected, and thus the load-level comparison unit 125 compares the own corrected load level and the load level of the radio base station eNB2 indicated by load information received by the network communication unit 140. The load-level comparison unit 125 makes a comparison every time the network communication unit 140 receives a Resource Status Update message.

The parameter adjustment unit 126 is configured to adjust the handover parameter according to a result of comparison made by the load-level comparison unit 125.

To be specific, the parameter adjustment unit 126 adjusts the handover parameter to expand its coverage when its corrected load level is lower than the load level of the radio base station eNB2. For example, the parameter adjustment unit 126 increases an offset value to be added to an RSRP of the radio base station eNB1, or reduces an offset value to be added to an RSRP of the radio base station eNB2, to thereby make spurious expansion of its coverage.

Moreover, the parameter adjustment unit 126 adjusts the handover parameter to reduce its coverage when its corrected load level is higher than the load level of the radio base station eNB2. For example, the parameter adjustment unit 126 reduces the offset value to be added to the RSRP of the radio base station eNB1, or increases the offset value to be added to the RSRP of the radio base station eNB2, to thereby make spurious reduction of its coverage.

Note that the parameter adjustment unit 126 needs to be permitted by the radio base station eNB2 to adjust the handover parameter. For this reason, the parameter adjustment unit 126 notifies the radio base station eNB2 of the adjusted handover parameter by a Mobility Change Request message, and adjusts the handover parameter only when it is confirmed that the adjusted handover parameter is accepted.

(1.3) Operation of Radio Communication System

Figure 3:
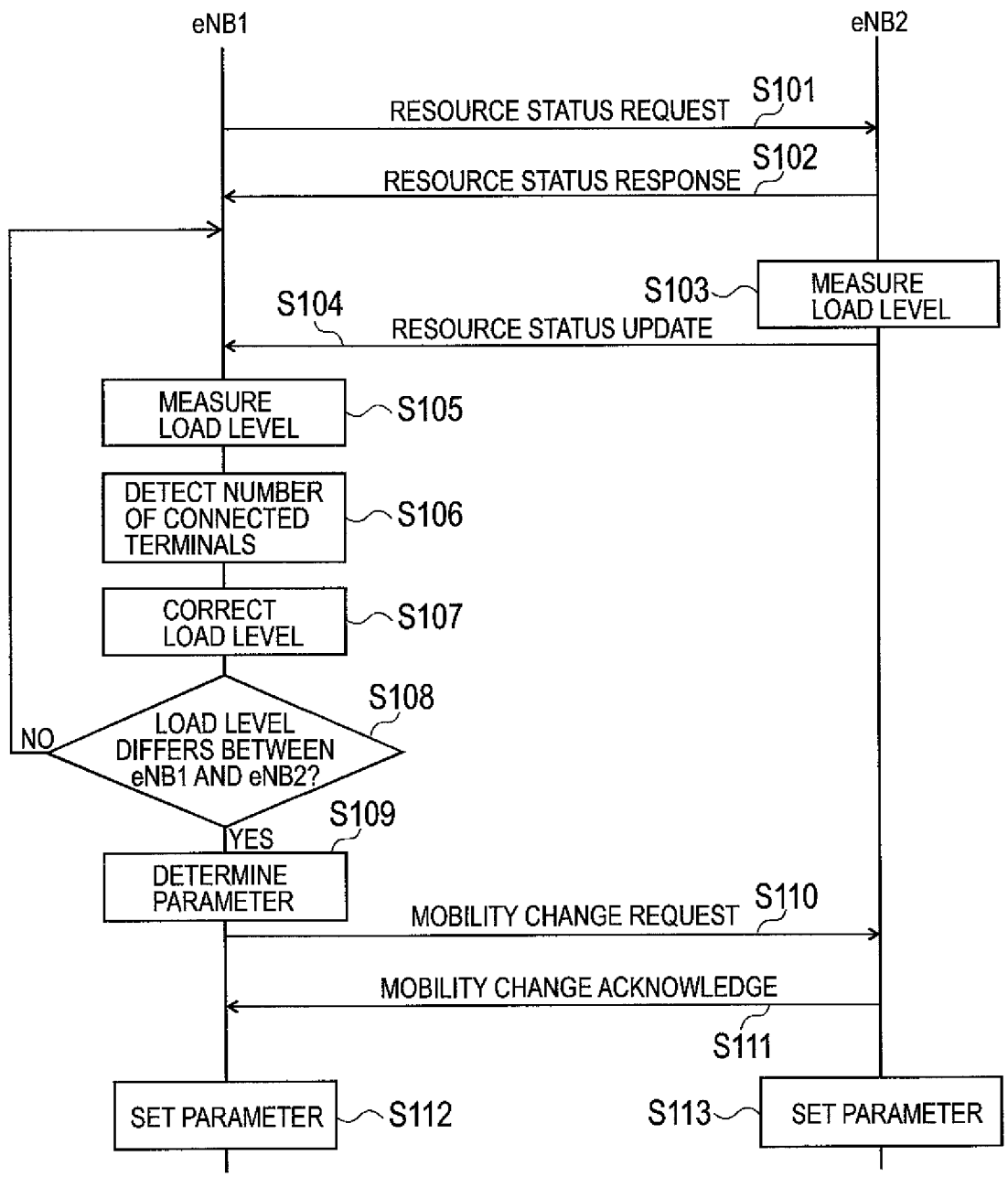
FIG. 3 is an operation sequence chart showing an operation of the radio communication system of the first embodiment of the present invention.

Hereinafter, an operation of the radio communication system 1 of the first embodiment will be described. FIG. 3 is an operation sequence chart showing an operation of the radio communication system 1 of the first embodiment.

In step S101, the message generator 121 of the radio base station eNB1 generates a Resource Status Request message, and the network communication unit 140 sends the Resource Status Request message to the radio base station eNB2. The radio base station eNB2 receives the Resource Status Request message.

In step S102, in a case of accepting the Resource Status Request message, the radio base station eNB2 sends a Resource Status Response message to the radio base station eNB1. The network communication unit 140 of the radio base station eNB1 receives the Resource Status Response message.

In step S103, the radio base station eNB2 measures a load level of a class indicated by Report Characteristics included in the Resource Status Request message. Note that the processing of step S103 may be performed between steps S101 and S102.

In step S104, the radio base station eNB2 sends a Resource Status Update message including load information indicating the measured load level to the radio base station eNB1. The network communication unit 140 of the radio base station eNB1 receives the Resource Status Update message.

In step S105, the load-level measurement unit 122 of the radio base station eNB1 measures its own load level.

In step S106, the connected-terminal number detector 123 of the radio base station eNB1 detects the number of radio terminals UE1 connected to the radio base station eNB1. Note that the processing of step S106 may be performed before step S105.

In step S107, the load-level correction unit 124 of the radio base station eNB1 corrects its own load level measured by the load-level measurement unit 122, depending on the number of radio terminals UE1 detected by the connected-terminal number detector 123.

Note that the processing of steps S105 to S107 may be performed before step S104.

In step S108, the load-level comparison unit 125 of the radio base station eNB1 compares its load level corrected by the load-level correction unit 124 and the load level of the radio base station eNB2 indicated by the load information received by the network communication unit 140. When the corrected load level of the radio base station eNB1 is the same as the load level of the radio base station eNB2 (step S108: NO), the handover parameter is in an optimized state, and thus current adjustment of the handover parameter is omitted and the processing returns to step S103.

When the corrected load level of the radio base station eNB1 differs from the load level of the radio base station eNB2 (step S108: YES), in step S109, the parameter adjustment unit 109 of the radio base station eNB1 determines an adjusted handover parameter. When the corrected load level of the radio base station eNB1 is lower than the load level of the radio base station eNB2, the parameter adjustment unit 125 determines an adjusted handover parameter so that coverage of the radio base station eNB1 is expanded. Meanwhile, when the corrected load level of the radio base station eNB1 is higher than the load level of the radio base station eNB2, the parameter adjustment unit 125 determines an adjusted handover parameter so that coverage of the radio base station eNB1 is reduced.

In step S110, the message generator 121 generates a Mobility Change Request message including the adjusted handover parameter, and the network communication unit 140 sends the Mobility Change Request message to the radio base station eNB2. The radio base station eNB2 receives the Mobility Change Request message.

In step S111, in a case of accepting the Mobility Change Request message, the radio base station eNB2 sends a Mobility Change Acknowledge message to the radio base station eNB1.

In steps S112 and S113, the radio base station eNB1 and the radio base station eNB2 set adjusted handover parameters.

(1.4) Effects and Advantages

As has been described, the radio base station eNB1 corrects its own measured load level depending on the number of radio terminals UE1 connected to itself, and adjusts the handover parameter according to a comparison between the corrected own load level and the load level of the radio base station eNB2. Thus, it is possible to balance loads between the radio base stations while reducing unfairness among the radio terminals.

In the first embodiment, the smaller the number of radio terminals UE1 connected to the radio base station eNB1, the lower the radio base station eNB1 corrects its own load level as compared to the load level of the radio base station eNB2. This makes it less likely for the load of the radio base station eNB1 to be regarded as being relatively high, when few radio terminals UE1 exclusively use radio resources of the radio base station eNB1. Accordingly, it is possible to restrict adjustment of the handover parameter for reduction of coverage of the radio base station eNB1 in such a case. As a result, handovers by radio terminals UE1 to the radio base station eNB2 due to the adjustment in the parameter are restricted, and unfairness among the radio terminals UE1 and the radio terminals UE2 can be reduced.

In the first embodiment, the larger the number of radio terminals connected to the radio base station eNB1, the higher the radio base station eNB1 corrects its own load level as compared to the load level of the radio base station eNB2. This makes it less likely for the load of the radio base station eNB1 to be regarded as being relatively low, when many radio terminals UE1 are connected to the radio base station eNB1. Accordingly, it is possible to restrict adjustment of the handover parameter for expansion of coverage of the radio base station eNB1 in such a case. As a result, handovers by radio terminals UE2 to the radio base station eNB1 due to the adjustment in the parameter are restricted, and unfairness among the radio terminals UE1 and the radio terminals UE2 can be reduced.

(2) Second Embodiment

Hereafter, a description is given of a second embodiment of the present invention mainly on points different from the first embodiment. While the radio base station eNB1 being the load-information reception side performs correction in the first embodiment, the radio base station eNB2 being the load-information transmission side performs correction instead of the radio base station eNB1 in the second embodiment.

(2.1) Configuration of Radio Base Station eNB2

Figure 4:
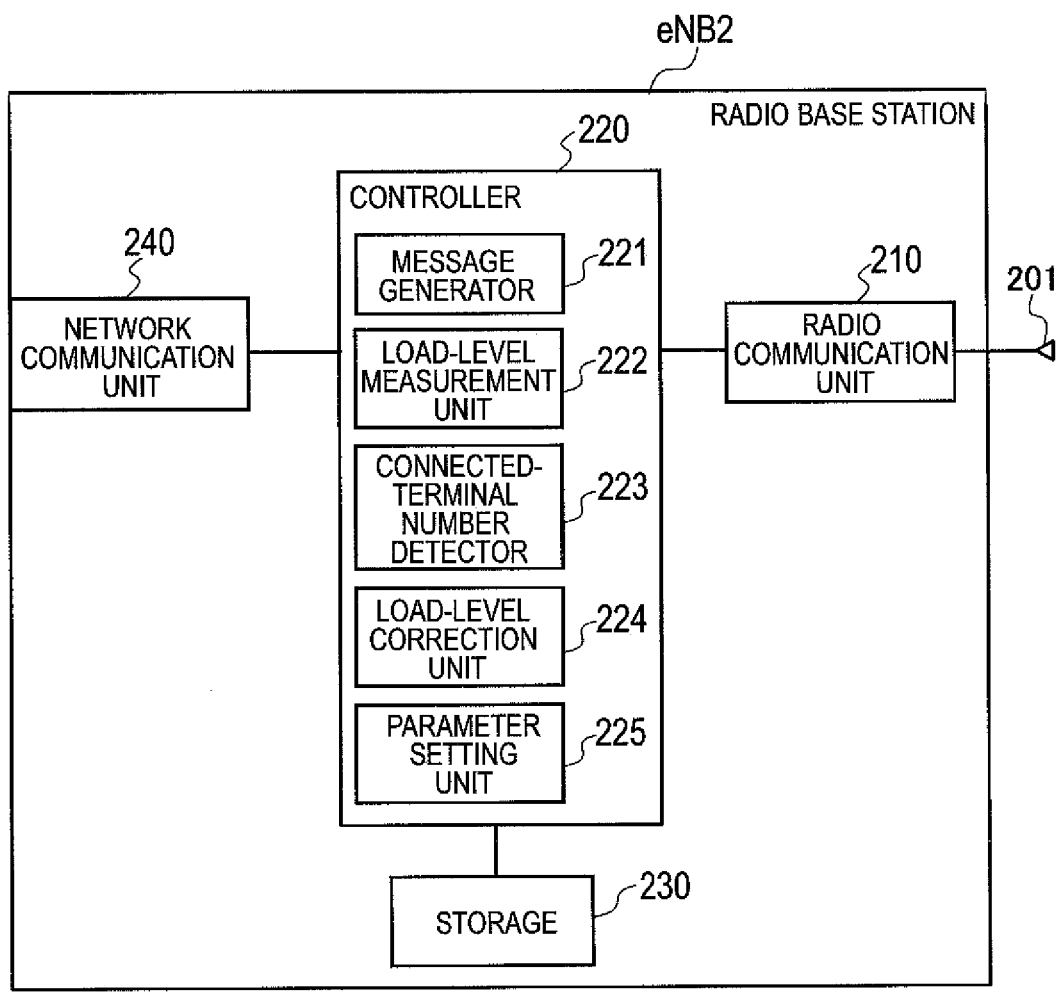
FIG. 4 is a block diagram showing a configuration of a radio base station of the second embodiment of the present invention.

Next, a description is given of a configuration of the radio base station eNB2 of the second embodiment. FIG. 4 is a block diagram showing a configuration of the radio base station eNB2.

As shown in FIG. 4, the radio base station eNB2 includes an antenna unit 201, a radio communication unit 210, a controller 220, a storage 230, and a network communication unit 240.

The antenna unit 201 is used to send and receive radio signals. The radio communication unit 210 is formed of a radio frequency (RF) circuit, a baseband (BB) circuit and the like, for example, and is configured to exchange radio signals with the radio terminal UE2 via the antenna unit 201. In addition, the radio communication unit 210 is configured to modulate and encode transmission signals, as well as to demodulate and decode reception signals.

The controller 220 is formed of a CPU, for example, and is configured to control various functions of the radio base station eNB2. The storage 230 is formed of a memory, for example, and is configured to store therein various information used for control and the like of the radio base station eNB2. The network communication unit 240 is configured to perform inter-base station communication using the X2 interface, and communication using the S1 interface.

The controller 220 includes a message generator 221, a load-level measurement unit 222, a connected-terminal number detector 223, a load-level correction unit 224, and a parameter setting unit 226.

The message generator 221 generates: a Resource Status Response message or a Resource Status Failure message being responses to a Resource Status Request message; a Resource Status Update message including load information; and a Mobility Change Acknowledge message or a Mobility Change Failure message being responses to a Mobility Change Request message.

The load-level measurement unit 222 is configured to measure its own load level (i.e., load level of the radio base station eNB2). The load-level measurement unit 222 may be configured to measure the load level only of the class selected in the aforementioned Report Characteristics.

The connected-terminal number detector 223 is configured to detect the number of radio terminals UE2 connected to its radio base station eNB2. For example, the connected-terminal number detector 223 can detect the number of radio terminals UE2 connected to the radio base station eNB2 by referring to information from a scheduler (not shown) included in the radio base station eNB2. The scheduler is configured to allocate and release radio resources (PRBs) to and from the radio terminals UE2.

The load-level correction unit 224 is configured to correct its own load level (i.e., load level of the radio base station eNB2) measured by the load-level measurement unit 222, depending on the number of radio terminals UE2 detected by the connected-terminal number detector 223. Specifically, the smaller the number of radio terminals UE2 connected to the radio base station eNB2, the lower the load-level correction unit 224 corrects its own load level (load level of the radio base station eNB2) measured by the load-level measurement unit 222. Alternatively, the larger the number of radio terminals UE2 connected to the radio base station eNB2, the higher the load-level correction unit 224 corrects its own load level (load level of the radio base station eNB2) measured by the load-level measurement unit 222.

For example, a correction value for each of segments of number of connected terminals is previously stored in the storage 230. The load-level correction unit 224 reads a correction value corresponding to the number of radio terminals UE2 detected by the connected-terminal number detector 223 from the storage 230, and makes a correction by adding the read correction value to its own load level measured by the load-level measurement unit 222.

Alternatively, a correction-value calculation formula to which the number of terminals can be assigned is stored in the storage 230. The load-level correction unit 224 makes a correction by assigning the number of radio terminals UE2 detected by the connected-terminal number detector 223 to the correction-value calculation formula, and adding the correction value calculated from the correction-value calculation formula to its own load level measured by the load-level measurement unit 222.

Then, the message generator 221 generates a Resource Status Update message including load information indicating its own load level corrected by the load-level correction unit 224. The network communication unit 240 sends the Resource Status Update message to the radio base station eNB1.

The parameter setting unit 226 sets the adjusted handover parameter reported by the radio base station eNB1. To be specific, in a case of accepting the adjusted handover parameter included in the Mobility Change Request message, the parameter setting unit 226 stores the adjusted handover parameter to the storage 230.

(2.2) Operation of Radio Communication System

Figure 5:
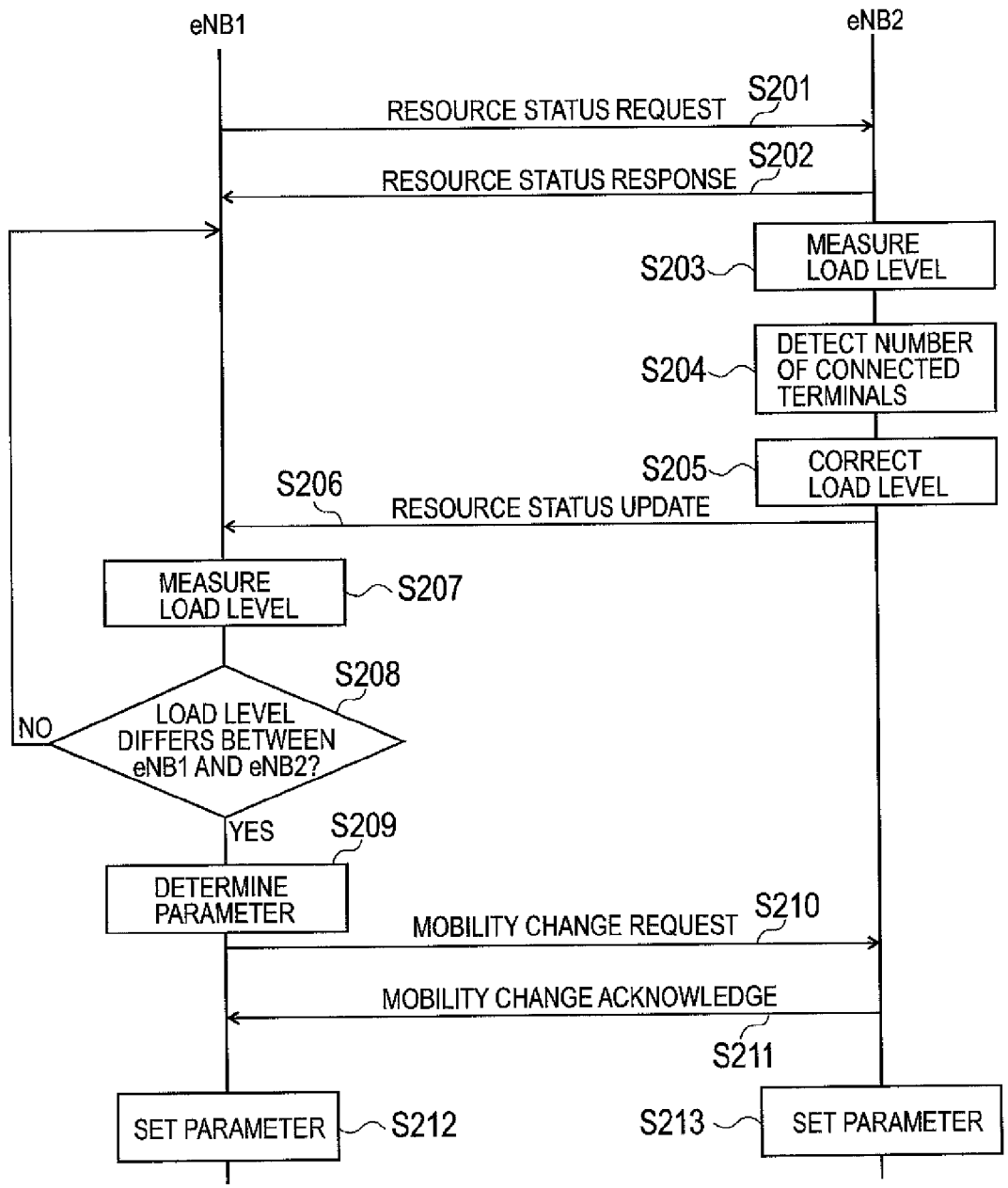
FIG. 5 is an operation sequence chart showing an operation of a radio communication system of the second embodiment of the present invention.

Hereinafter, an operation of the radio communication system 1 of the second embodiment will be described. FIG. 5 is an operation sequence chart showing an operation of the radio communication system 1 of the second embodiment. Note that although the configuration of FIG. 2 is referred to as the configuration of the radio base station eNB1, the radio base station eNB1 of the second embodiment does not include the connected-terminal number detector 123 or the load-level correction unit 124.

In step S201, the message generator 121 of the radio base station eNB1 generates a Resource Status Request message, and the network communication unit 140 sends the Resource Status Request message to the radio base station eNB2. The network communication unit 240 of the radio base station eNB2 receives the Resource Status Request message.

In step S202, in a case of accepting the Resource Status Request message, the message generator 221 of the radio base station eNB2 generates a Resource Status Response message. The network communication unit 240 of the radio base station eNB2 sends the Resource Status Response message generated by the message generator 221 to the radio base station eNB1. The network communication unit 140 of the radio base station eNB1 receives the Resource Status Response message.

In step S203, the load-level measurement unit 222 of the radio base station eNB2 measures a load level of a class indicated by Report Characteristics, included in the Resource Status Request message.

In step S204, the connected-terminal number detector 223 of the radio base station eNB2 detects the number of radio terminals UE2 connected to the radio base station eNB2.

In step S205, the load-level correction unit 224 of the radio base station eNB2 corrects its own load level measured by the load-level measurement unit 222, depending on the number of radio terminals UE2 detected by the connected-terminal number detector 223.

In step S206, the message generator 221 of the radio base station eNB2 generates a Resource Status Update message including load information indicating its own corrected load level. The network communication unit 240 of the radio base station eNB2 sends the Resource Status Update message generated by the message generator 221 to the radio base station eNB1. The network communication unit 140 of the radio base station eNB1 receives the Resource Status Update message.

In step S207, the load-level measurement unit 122 of the radio base station eNB1 measures its own load level.

In step S208, the load-level comparison unit 125 of the radio base station eNB1 compares its own load level measured by the load-level measurement unit 122, and the load level of the radio base station eNB2 indicated by the load information received by the network communication unit 140 (i.e., the corrected load level of the radio base station eNB2). When the load level of the radio base station eNB1 is the same as the corrected load level of the radio base station eNB2 (step S208: NO), the handover parameter is in an optimized state, and thus current adjustment of the handover parameter is omitted and the processing returns to step S203.

When the load level of the radio base station eNB1 differs from the corrected load level of the radio base station eNB2 (step S208: YES), in step S209, the parameter adjustment unit 109 of the radio base station eNB1 determines an adjusted handover parameter. When the load level of the radio base station eNB1 is lower than the corrected load level of the radio base station eNB2, the parameter adjustment unit 125 determines an adjusted handover parameter so that coverage of the radio base station eNB1 is expanded. Meanwhile, when the load level of the radio base station eNB1 is higher than the corrected load level of the radio base station eNB2, the parameter adjustment unit 125 determines an adjusted handover parameter so that coverage of the radio base station eNB1 is reduced.

In step S210, the message generator 121 of the radio base station eNB1 generates a Mobility Change Request message including the adjusted handover parameter, and the network communication unit 140 sends the Mobility Change Request message to the radio base station eNB2. The network communication unit 240 of the radio base station eNB2 receives the Mobility Change Request message.

In step S211, in a case of accepting the Mobility Change Request message, the message generator 221 of the radio base station eNB2 generates a Mobility Change Acknowledge message. The network communication unit 240 of the radio base station eNB2 sends the Mobility Change Acknowledge message to the radio base station eNB1. The network communication unit 140 of the radio base station eNB1 receives the Mobility Change Acknowledge message.

In step S212, the parameter adjustment unit 126 of the radio base station eNB1 sets the adjusted handover parameter.

In step S213, the parameter setting unit 225 of the radio base station eNB2 sets the adjusted handover parameter.

(2.3) Effects and Advantages

As has been described, the radio base station eNB2 corrects its own measured load level depending on the number of radio terminals UE2 connected to itself, and sends a Resource Status Update message including load information indicating its own corrected load level to the radio base station eNB1. Thus, it is possible to balance loads between the radio base stations while reducing unfairness among the radio terminals.

In the second embodiment, the smaller the number of radio terminals UE2 connected to the radio base station eNB2, the lower the radio base station eNB2 corrects its own measured load level. This makes it less likely for the load of the radio base station eNB2 to be regarded as being relatively high, when few radio terminals UE2 exclusively use radio resources of the radio base station eNB2. Accordingly, unfairness among the radio terminals UE1 and the radio terminals UE2 can be reduced.

In the second embodiment, the larger the number of radio terminals connected to the radio base station eNB2, the higher the radio base station eNB2 corrects its own measured load level. This makes it less likely for the load of the radio base station eNB2 to be regarded as being relatively low, when many radio terminals UE2 are connected to the radio base station eNB2. Accordingly, unfairness among the radio terminals UE1 and the radio terminals UE2 can be reduced.

(3) Third Embodiment

Hereafter, a description is given of a third embodiment of the present invention mainly on points different from the first and second embodiments. In the first embodiment, the radio base station eNB1 being the load-information reception side performs correction, and in the second embodiment, the radio base station eNB2 being the load-information transmission side performs correction instead of the radio base station eNB1. In the third embodiment, a description is given of a case where correction is performed by both of the radio base station eNB1 and the radio base station eNB2.

Figure 6:
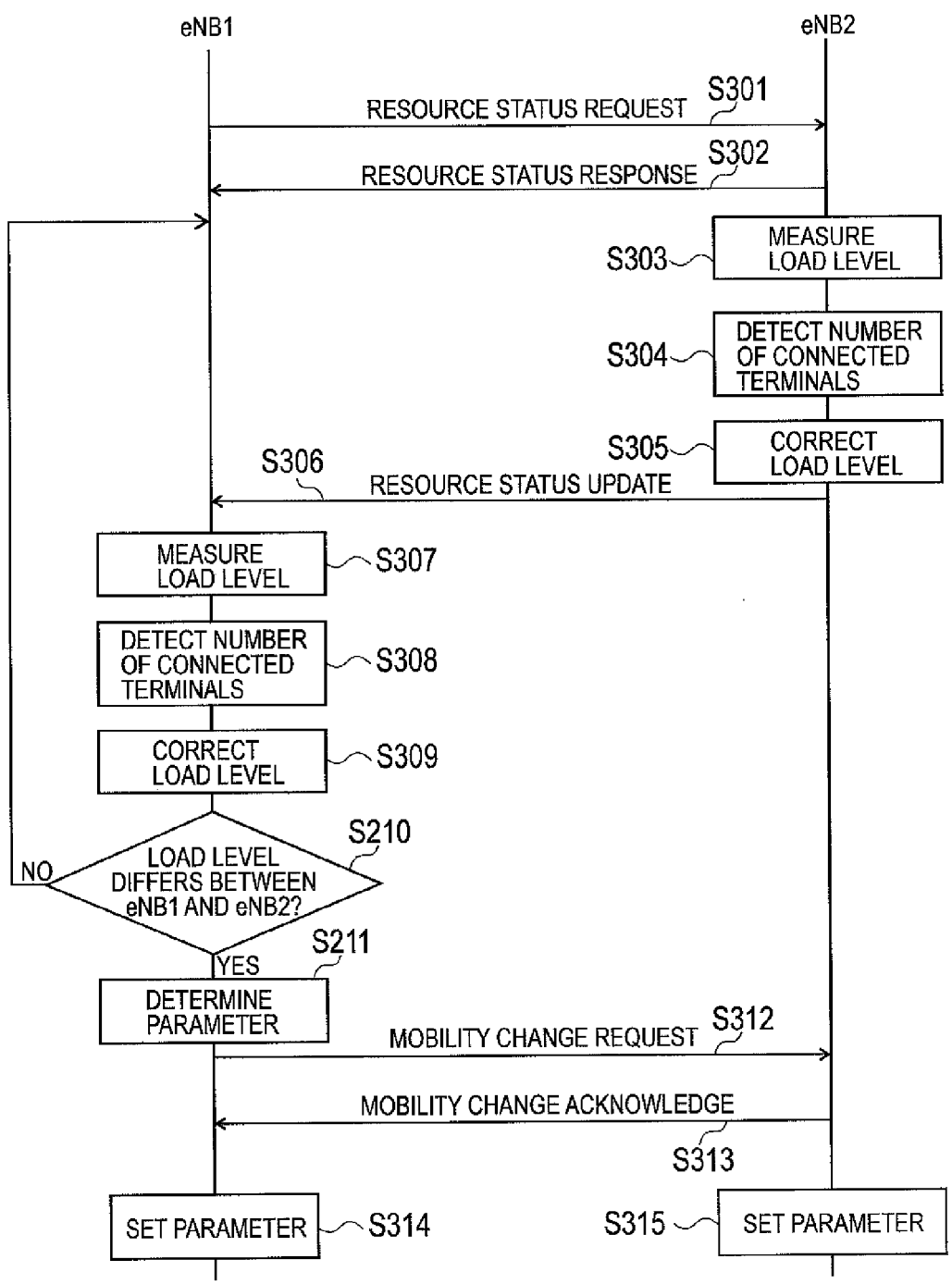
FIG. 6 is an operation sequence chart showing an operation of a radio communication system of the third embodiment of the present invention.

FIG. 6 is an operation sequence chart showing an operation of the radio communication system 1 of the third embodiment. The configuration of FIG. 2 is referred to as the configuration of the radio base station eNB1, and the configuration of FIG. 4 is referred to as the configuration of the radio base station eNB2.

Processing of steps S301 to S306 is the same as that of steps S201 to S206 described in the second embodiment.

In step S307, the load-level measurement unit 122 of the radio base station eNB1 measures its own load level.

In step S308, the connected-terminal number detector 123 of the radio base station eNB1 detects the number of radio terminals UE1 connected to the radio base station eNB1.

In step S309, the load-level correction unit 124 of the radio base station eNB1 corrects its own load level measured by the load-level measurement unit 122, depending on the number of radio terminals UE1 detected by the connected-terminal number detector 123.

In step S310, the load-level comparison unit 125 of the radio base station eNB1 compares its own load level corrected by the load-level correction unit 124, and the load level of the radio base station eNB2 indicated by load information received by the network communication unit 140 (i.e., the corrected load level of the radio base station eNB2). When the corrected load level of the radio base station eNB1 is the same as the corrected load level of the radio base station eNB2 (step S310: NO), the handover parameter is in an optimized state, and thus current adjustment of the handover parameter is omitted and the processing returns to step S303.

When the corrected load level of the radio base station eNB1 differs from the corrected load level of the radio base station eNB2 (step S310: YES), in step S311, the parameter adjustment unit 109 of the radio base station eNB1 determines an adjusted handover parameter. When the corrected load level of the radio base station eNB1 is lower than the corrected load level of the radio base station eNB2, the parameter adjustment unit 125 determines an adjusted handover parameter so that coverage of the radio base station eNB1 is expanded. Meanwhile, when the corrected load level of the radio base station eNB1 is higher than the corrected load level of the radio base station eNB2, the parameter adjustment unit 125 determines an adjusted handover parameter so that coverage of the radio base station eNB1 is reduced.

Processing of steps S312 to S315 is the same as that in steps S210 to S213 described in the second embodiment.

As has been described, according to the third embodiment, loads can be balanced between the radio base station eNB1 and the radio base station eNB2, while taking into consideration the number of mobile terminals connected to each of the radio base station eNB1 and the radio base station eNB2. Hence, it is possible to further reduce unfairness among the radio terminals UE1 and the radio terminals UE2.

(4) Other Embodiments

Hereinabove, the present invention has been described by using the embodiments. However, it should not be understood that the description and drawings which constitute part of this disclosure limit the present invention. From this disclosure, various alternative embodiments, examples, and operation techniques will be easily found by those skilled in the art.

Although an offset value is described as a handover parameter in the above embodiment, a handover threshold compared with an RSRP may be adjusted instead of the offset value. Moreover, instead of adjusting the handover parameter, other base station parameters (such as an antenna tilt angle or a transmission power) may be adjusted to physically change coverage.

The description of the above embodiment has been given of a radio communication system according to LTE (3GPP Release 8 or 9). However, in LTE Advanced (3GPP Release 10) of improved LTE, provision of a heterogeneous network including multiple types of radio base stations having different transmission powers is scheduled. The present invention is also applicable to such a heterogeneous network. Moreover, in LTE Advanced, provision of a relay node being a radio base station forming backhaul by radio waves is also scheduled. Such a relay node may also be used as the radio base station of the present invention.

Furthermore, although the above embodiment has been described using an LTE system, the present invention is also applicable to other radio communication systems such as a radio communication system according to mobile WiMAX (IEEE 802.16e).

Hence, it should be understood that the present invention includes various embodiments which are not described herein.

Note that the entire content of Japanese Patent Application No. 2010-122144 (filed on May 27, 2010) is incorporated herein by reference.

INDUSTRIAL APPLICABILITY

As has been described, according to the radio communication system, the radio base station, and the base station parameter-adjustment method of the pre sent invention, loads can be balanced between radio base stations while reducing unfairness among radio terminals. Accordingly, the present invention is useful in radio communication such as mobile communication.

The invention claimed is:

1. A radio communication system comprising:
a first radio base station configured to transmit a first load level of the first radio base station; and
a second radio base station configured to:
measure a second load level of the second radio base station, wherein the second load level includes a first value that is a usage of PRBs (Physical Resource Blocks) being units for time-frequency resource allocation, a second value that is a load of backhaul between the first radio base station and a core network, a third value that is a hardware load of the first radio base station, and a fourth value that is related to a communication capacity of the first radio base station;
detect a number of radio terminals connected to the second radio base station;
modify the measured second load level on the basis of the detected number, wherein the modified second load level is not the actual load level of the second radio base station, wherein the larger the detected number, the higher the controller modifies the measured second load level, and the smaller the detected number, the lower the controller modifies the measured second load level, and receive the first load level of the first radio base station; wherein the second radio base station is further configured to adjust a base station parameter defining coverage, according to a result of comparison between the first load level and the modified second load level.

2. A first radio base station comprising:
a controller configured to:
measure a first load level of the first radio base station, wherein the first load level includes a first value that is a usage of PRBs (Physical Resource Blocks) being units for time-frequency resource allocation, a second value that is a load of backhaul between the first radio base station and a core network, a third value that is a hardware load of the first radio base station, and a fourth value that is related to a communication capacity of the first radio base station;
detect a number of radio terminals connected to the first radio base station; and
modify the measured first load level on the basis of the detected number, wherein the modified first load level is not the actual load level of the first radio base station, wherein the larger the detected number, the higher the controller modifies the measured first load level, and the smaller the detected number, the lower the controller modifies the measured first load level; and
a receiver configured to receive a second load level of a second radio base station; wherein
the controller is further configured to adjust a base station parameter defining coverage, according to a result of comparison between the second load level and the modified first load level.

3. The first radio base station according to claim 2, wherein when the modified first load level of the first radio base station is lower than the second load level of the second radio base station, the controller adjusts the base station parameter to expand coverage of the first radio base station.

4. The first radio base station according to claim 2, wherein when the modified first load level of the first radio base station is higher than the second load level of the second radio base station, the controller adjusts the base station parameter to reduce coverage of the first radio base station.

5. A first radio base station, comprising:
a controller configured to:
measure a first load level of the first radio base station, wherein the first load level includes a first value that is a usage of PRBs (Physical Resource Blocks) being units for time-frequency resource allocation, a second value that is a load of backhaul between the first radio base station and a core network, a third value that is a hardware load of the first radio base station, and a fourth value that is related to a communication capacity of the first radio base station;
detect a number of radio terminals connected to the first radio base station; and
modify the measured first load level on the basis of the detected number, wherein the modified first load level is not the actual load level of the first radio base station, wherein the larger the detected number, the higher the controller modifies the measured first load level, and the smaller the detected number, the lower the controller modifies the measured first load level; and
a transmitter configured to transmit the modified first load level to a second radio base station.

6. A method in a first base station, comprising the steps of:
measuring a first load level of the first radio base station, wherein the first load level includes a first value that is a usage of PRBs (Physical Resource Blocks) being units for time-frequency resource allocation, a second value that is a load of backhaul between the first radio base station and a core network, a third value that is a hardware load of the first radio base station, and a fourth value that is related to a communication capacity of the first radio base station;
detecting a number of radio terminals connected to the first radio base station;
modifying the measured first load level on the basis of the detected number, wherein the modified first load level is not the actual load level of the first radio base station, wherein the larger the detected number, the higher the controller modifies the measured first load level, and the smaller the detected number, the lower the controller modifies the measured first load level;
receiving, a second load level of a second radio base station; and
adjusting, a base station parameter defining coverage, according to a result of comparison between the second load level and the modified first load level.

* * * * *